(12) United States Patent  
Schaff

(10) Patent No.: US 8,117,252 B2  
(45) Date of Patent: Feb. 14, 2012

(54) VIDEO-MONITOR/RECORDING/PLAYBACK SYSTEM

(76) Inventor: Glen D. Schaff, Brookline, MA (US)

( * ) Notice: Subject to any disclaimer, the term of this patent is extended or adjusted under 35 U.S.C. 154(b) by 2449 days.

(21) Appl. No.: 10/746,171

(22) Filed: Dec. 24, 2003

(65) Prior Publication Data

US 2004/0136388 A1    Jul. 15, 2004

Related U.S. Application Data

(60) Provisional application No. 60/436,346, filed on Dec. 26, 2002, provisional application No. 60/487,486, filed on Jul. 16, 2003, provisional application No. 60/487,271, filed on Jul. 16, 2003.

(51) Int. Cl.
*G06F 15/16* (2006.01)

(52) U.S. Cl. ........ 709/200; 709/202; 382/118; 382/100; 725/105

(58) Field of Classification Search .................. 382/118, 382/100; 709/203, 205
See application file for complete search history.

(56) References Cited

U.S. PATENT DOCUMENTS

| | | | | |
|---|---|---|---|---|
| 5,497,149 | A  * | 3/1996 | Fast | 340/988 |
| 5,982,362 | A  * | 11/1999 | Crater et al. | 715/719 |
| 6,144,797 | A  * | 11/2000 | MacCormack et al. | 386/46 |
| 6,643,779 | B1 * | 11/2003 | Leung et al. | 726/14 |
| 6,698,021 | B1 * | 2/2004 | Amini et al. | 725/105 |
| 7,231,224 | B1 * | 6/2007 | Chesson | 455/523 |
| 7,665,114 | B2 * | 2/2010 | Safran et al. | 725/105 |
| 2002/0003575 | A1 * | 1/2002 | Marchese | 348/231 |
| 2002/0144187 | A1 * | 10/2002 | Morgan et al. | 714/43 |
| 2002/0170064 | A1 * | 11/2002 | Monroe et al. | 725/105 |
| 2003/0007663 | A1 * | 1/2003 | Wixson et al. | 382/100 |
| 2003/0023874 | A1 * | 1/2003 | Prokupets et al. | 713/201 |
| 2003/0043279 | A1 * | 3/2003 | Alardin | 348/211.3 |
| 2003/0158700 | A1 * | 8/2003 | Forler et al. | 702/178 |
| 2004/0078825 | A1 * | 4/2004 | Murphy | 725/109 |
| 2010/0111377 | A1 * | 5/2010 | Monroe | 382/118 |

* cited by examiner

*Primary Examiner* — John Follansbee  
*Assistant Examiner* — Glenford Madamba  
(74) *Attorney, Agent, or Firm* — Wilmer Cutler Pickering Hale & Dorr LLP.

(57) ABSTRACT

The invention relates to a stand-alone video recording, playback and Monitoring system. It has network switches, non-volatile storage devices, IP cameras, video servers, and NTSC cameras. The system uses communication channels that are WAN/LAN based and can be hard-wired or wireless.

9 Claims, 13 Drawing Sheets

The log-in window controls access to the system. A valid user name and password are required to gain access to the system. The user name also controls the features that are available to each user.
Figure 3. Login Window

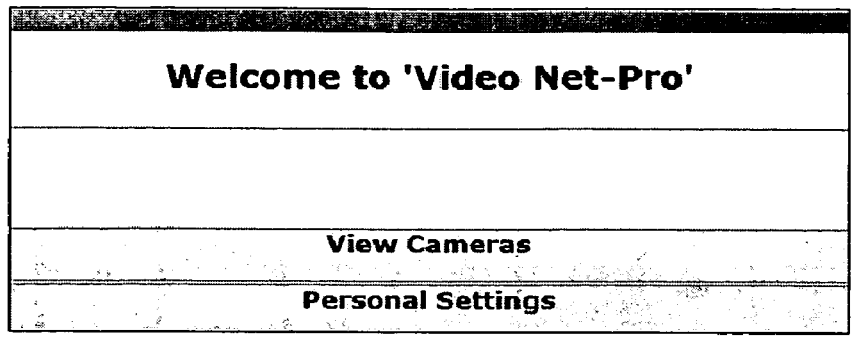
Figure 4. Minimal user privilege window
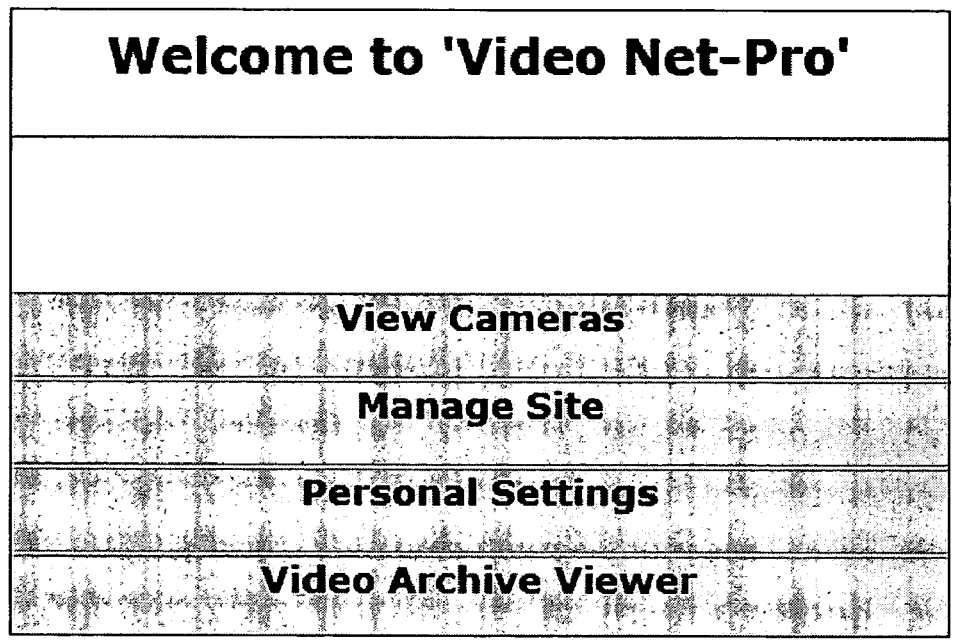
Figure 5. System Administrator menus

User Group Selection

| User Group Name | Admin | Archive Viewer | User | | |
|---|---|---|---|---|---|
| Administrator | True | True | False | Edit | |
| Test | False | False | False | Edit | Delete |
| User | False | False | True | Edit | Delete |
| Viewer | False | True | False | Edit | Delete |

[Add User Group]

Figure 6. User Group Selection

Add New User Group

[Add] [Clear/Reset] [Cancel]

| User Group Name * | |
| Title | |
| Group Description | |
| Is Admin | ☑ |
| Archive Viewer | ☐ |
| Is User | ☑ |

Figure 7. Add new user group

'Beacon St' Camera Settings

[Save] [Clear/Reset] [Cancel]

| Video Server Name * | Beacon St |
| Record On | ☑ |
| Motion Record On | ☐ |
| Cloaked | ☐ |
| Datestamp Image | ☑ |

Figure 8. Edit Camera Settings

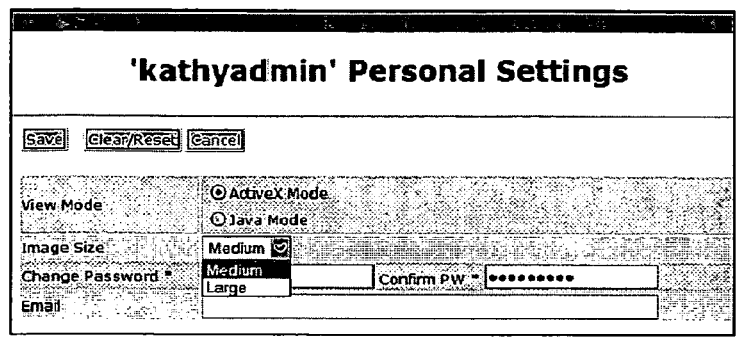
Figure 9. Personal Settings Button
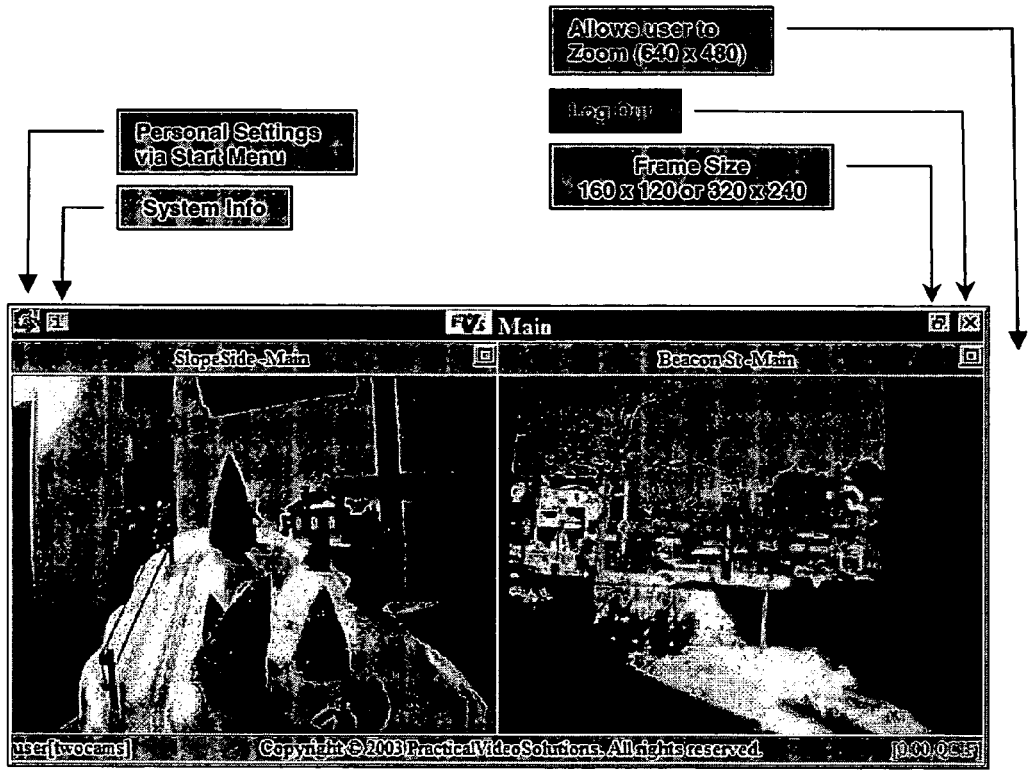
Figure 10. View Camera Window - Camera Controls

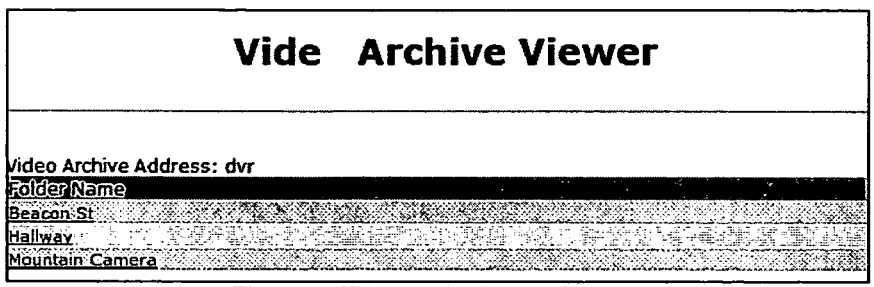
Figure 11. Video Archive Address Selection
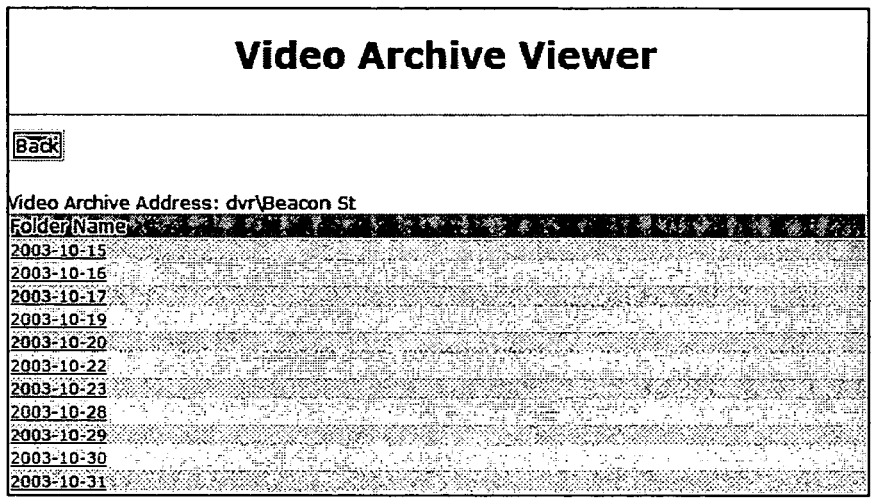
Figure 12. Video Archive Viewer Camera Date Menu
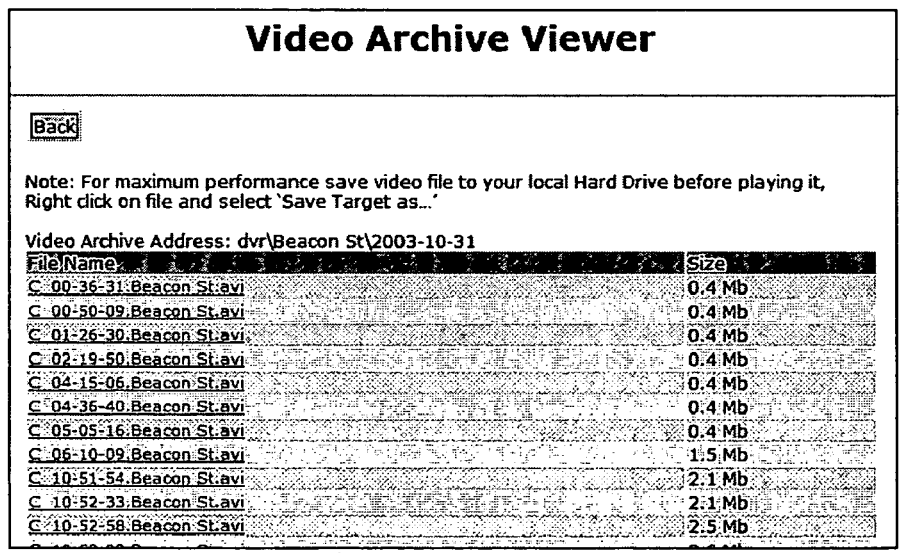
Figure 13. Video Camera viewer time files

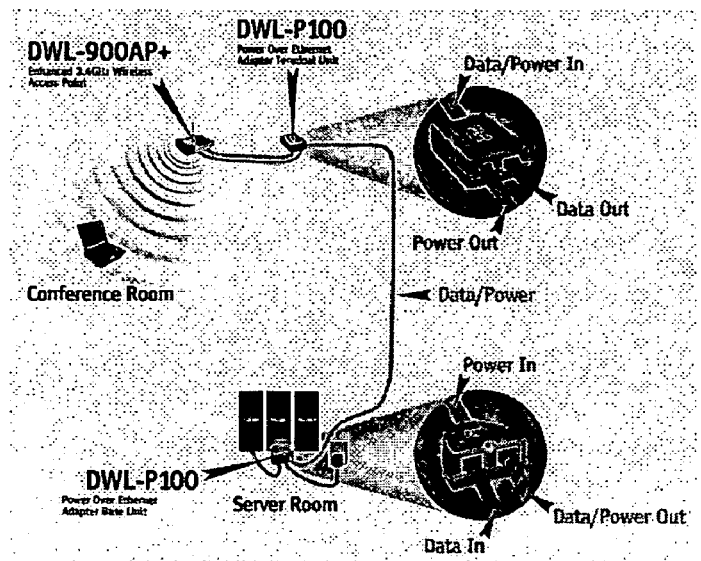
Figure 14. POE Base unit and Terminal
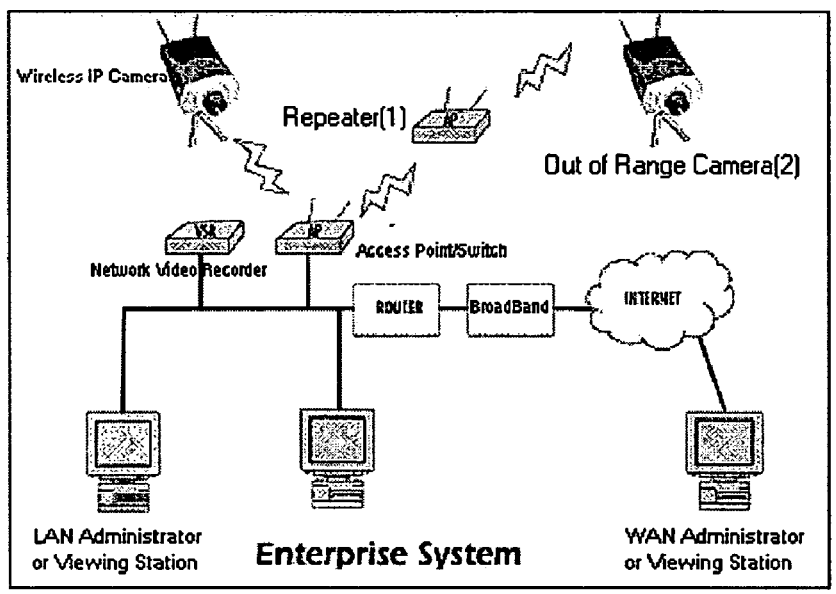
Figure 15. Repeater

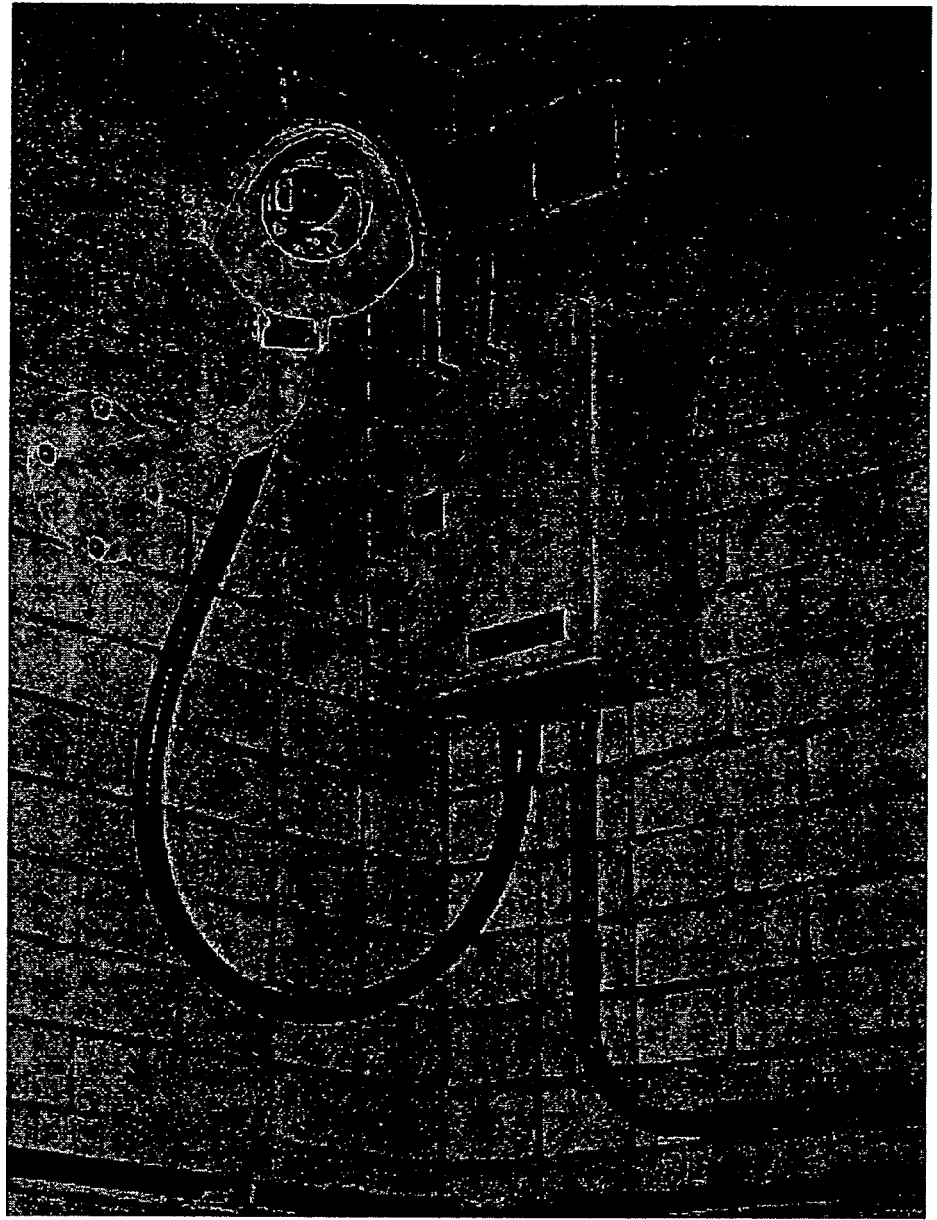
Figure 16. Wireless Corrosive Proof Camera

NVS in a suit case

NVS (cameras outside suit case)

Supported NVR Camera Connections

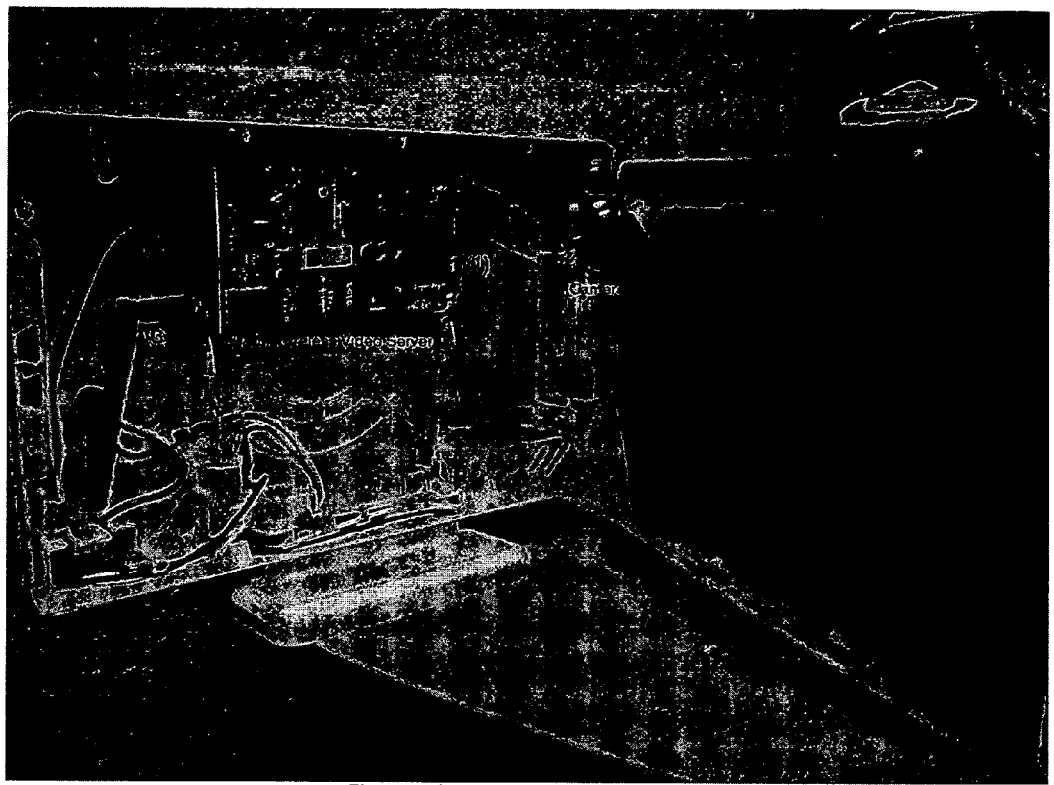
Figure 22 Covert Digital 802.11 IP Camera

Figure 23. Covert Camera Enclosure

VIDEO-MONITOR/RECORDING/PLAYBACK SYSTEM

A portion of the disclosure of this patent document contains material to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to video monitoring, surveillance and recording systems, and, more particularly, to a peripheral video delivery, archival, and playback system adapted for stand-alone use and operation supporting multiple users at separate remote interfaces capable of simultaneous access and system administration.

BACKGROUND OF THE INVENTION

The present invention relates to video delivery, recording and monitoring systems, and more particularly to a LAN/WAN based system where both the user and administrator interface need not be local to the system but can be on any remote node either attached to the main system via a Local Area Network (LAN) or Wide Area Network (WAN).

Since the early 70s various analog electronic video systems have been available for viewing and recording video. These systems are described as Closed Circuit TV (CCTV) systems. CCTV systems support cameras designed to transmit standard television input signals designed by the National Television System Committee (NTSC) in 1953[1]. A CCTV system supports multiple NTSC cameras connected to NTSC multiplexer which in turn connected to a video display and possibly a time lapse recorder (the video in this description never leaves the analog domain). This system is a closed loop system where video does not migrate outside the site where the system resides. See FIG. 17. Such multiplexing devices include: Panasonic WJFS409, Sony YS-DX516

[1] NTSC NTSC stands for National Television System Committee, which devised the NTSC television broadcast system in 1953. NTSC is also commonly used to refer to one type of television signal that can be recorded on various tape formats such as VHS, ¾" U-matic and Betacam. The NTSC standard has a fixed vertical resolution of 525 horizontal lines stacked on top of each other, with varying amounts of "lines" making up the horizontal resolution, depending on the electronics and formats involved. There are 59.94 fields displayed per second. A field is a set of even lines, or odd lines. The odd and even fields are displayed sequentially, thus interlacing the full frame. One full frame, therefore, is made of two interlaced fields, and is displayed about every ⅓₀ of a second.

Recently in the late 90s, a trend has started to replace the time lapse recorder with a digital video recorder (DVR). The DVR converts NTSC output from the video multiplexer to packets of digitized video and stores the now digitized video in files on a hard drive (FIG. 18). More recently, DVR began to combine the functionality of the DVR and multiplexer into a single unit. Such devices include: Pelco DX-9000, DVMRc4CT40 GE/Kalatel, Sony HSRX216/32.

In the past several years a few systems have emerged where the system no longer requires traditional analog cameras transmitting NTSC video signals. These systems connect to a network of digital IP cameras, (typically using TCP/IP). The DVR is replaced with a network video recorder (NVR, FIG. 1 item 3) which receives digitized video packets directly from cameras or devices known as video servers. Such cameras IP include: DLINK DCS-1000W, AXIS 2100, and XLENT 3133 (FIG. 1 items 1/2)

This form of a video management system has made it possible for video information to be processed as is any form of digital data and made available to any network connected system or user. Networked video system becomes an immediate beneficiary of other stand-alone networking peripherals that exist in the market place. Such peripherals include: network hard drives, network servers, and other forms of network mass storage systems.

In general once video data is digitized it can be referenced in its raw data form from any "connected" system. The migration from single-ended video systems into fully networked solutions introduces many new complexities to a once simply managed closed-loop system. Along with the complexities are enormous new possibilities for management, processing and usage of the now digitized data.

What is desired is to have a mechanism for a turnkey solution, taking full advantage of the now digitized video data where physical presence of viewers and administrators for system control is no longer a requirement and functionality can be distributed across a LAN/WAN network where it is most appropriate. Additionally this networked solution must simplify or eliminate the traditional complexities normally associated with networked systems, enabling a novice to install, administer and maintain.

SUMMARY OF THE INVENTION

The present invention is a Network Video Server (NVS) that communicates with networked devices and cameras that are physically wired, or wirelessly connected to a network infrastructure (backbone). Video output, recorded output and system control is made available through standard WEB browser interfaces that can be connected to the local LAN, or on any remote leg of a WAN to which the server is attached. To accommodate this functionality, the server includes the following software components: an embedded web server (WAN connectivity), an embedded enterprise class database server (system management), an embedded dynamic IP client (24/7 connectivity), a network video recorder (NVR) a client/administrator GUI builder, a remote login server, an embedded time and event manager for processing digital inputs and outputs in real-time to either signal an event occurrence or assert an external trigger/alarm. The invention also comprises the necessary software/hardware infrastructure to implement a robust solution such that any single fault does not affect operation of the rest of the system and the entire system itself is semi-fault tolerant with built-in error detection, correction and recovery.

The objects, advantages and other novel features of the present invention are apparent from the following detailed description when read in conjunction with the appended claims and attached drawing.

BRIEF DESCRIPTION OF THE DRAWINGS

FIG. 3 is the system login window. This window is created from DHTML on the host server and delivered to the user from the embedded web server in the host. The window authenticates user login.

FIG. 4, FIG. 5 shows two potential "Post Login" windows. Neither of which exists in hard coded form. These menus are created dynamically, as are all menus and interface components, against the database based on user privileges and time/date properties of the system.

FIG. 6 shows the "USER GROUP MENU". This menu is available only to accounts that have been assigned administration privileges. The sub menus enable adding, deleting and editing existing user groups.

FIG. 7 shows the menu for adding a new user groups.

FIG. 8 shows the menu for editing the assigned properties of a camera. This menu is only accessible to an administrator. The assigned name will also be attached to any video files created.

FIG. 9 is the "personal settings menu", this menu enables each user to assign specific default settings to their account. This personalizes each users interface to the system.

FIG. 10 shows a "Viewing Window" with two cameras assigned to the end user. This window is created dynamically by the system against a user login and built based on their personal preferences and account privileges.

FIGS. 11, 12, 13 shows a successive drill-down through the video archive viewer interface. These windows first show the available sources of recorded video (FIG. 11), then the dates to which video is available for a selected camera (FIG. 12), and finally the user may access any video clip for a specific time via a timed clip selection in FIG. 13.

FIG. 14 Shows a POE adapter with a base and terminal unit.

FIG. 15 shows a repeater used to reach a wireless camera that is out of range of the base access point FIG. 16 shows an example of a wireless corrosive-proof camera.

FIG. 19 shows all components inside suitcase, FIG. 20 shows two wireless video cameras with a third wireless video server connected to an analog NTSC video camera in the front.

FIG. 22 shows a covert 802.11 wireless camera system concealed inside a standard exit sign enclosure FIG. 23 shows the covert 802.11 wireless camera totally concealed in an exit sign

DESCRIPTION OF THE PREFERRED EMBODIMENT

Figure 1:
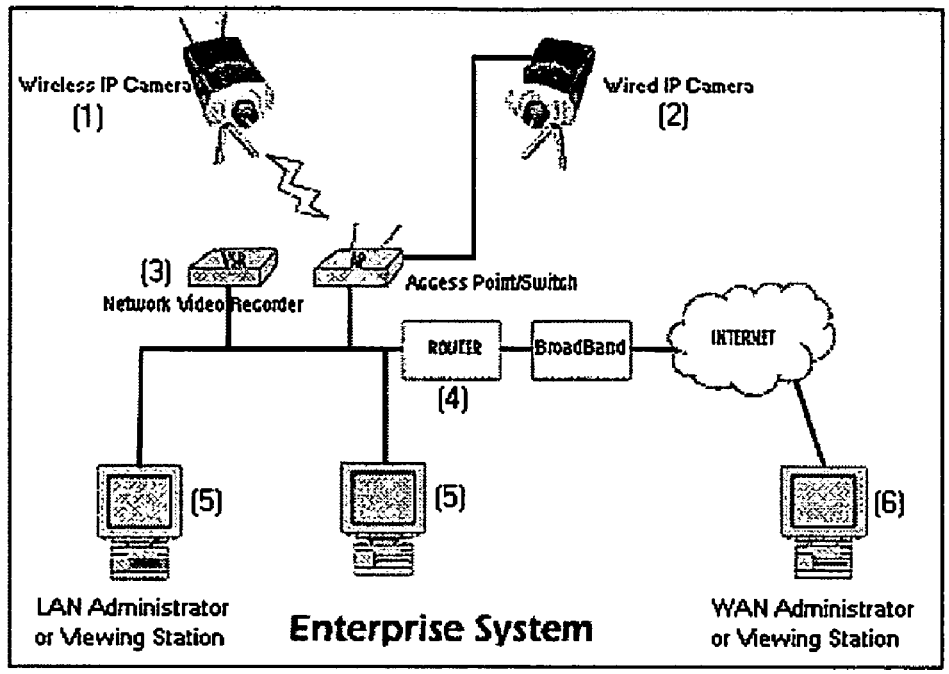
FIG. 1 is a block diagram view of a network video management system with wireless and wired IP cameras. This drawing has computers on the local subnet and is physically connected to the intranet by a broadband router (item 4).

System Description:

Referring now to FIG. 1 a networked video system includes a network video management server (host computer) that communicates to all other devices via TCP/IP or UDP, an Ethernet router (item 4), any number of wired or wireless IP cameras (FIG. 21), Ethernet switches and wireless access points (see Photo 19) and a non-volatile storage mechanism (i.e. hard drive). Access to system resources (such as cameras) is established by the host computer with physical connectivity to attached devices managed by a hardware router (FIG. 1, item 4). The router can manage connectivity to both local clients on the router's private internal subnet, and remote clients via an external broadband connection. Remote desktop viewing or administration stations can be any client computer physically attached to the internet/intranet (FIG. 1, item 6/5) capable of running an industry standard browser such as Microsoft IE. The system is protected from outside intrusion via a hardware firewall that sits between the broadband modem, and the private network of the system router. (See provisional patent 60/436,346, Dec. 26, 2002).

Remote System Access (Dynamic IP):

To connect to a remote web server an internet address is specified in a browser. This address is specified via a URL (universal resource locator) or textual site name. Browsers must have URLs translated to physical addresses on the WEB (IP addresses). This translation is typically performed by a Domain Name Server (DNS). Until recently all IP addresses had been static or constant, however with the shortage of IP addresses many ISPs have chosen to give connecting clients temporary or dynamic IP addresses. In this model, connected systems are granted a temporary IP address only for a certain time period (lease). To connect to a remote web server via a URL, the specified URL therefore must either be static or must reference a site that resolves dynamic IPs. To resolve dynamic IPs, a dynamic IP client is installed on the NVS. The dynamic IP client updates a web based dynamic IP host periodically with its assigned (dynamic) IP and its URL. This host is pointed to by the URL specified from a login browser when connecting to an NVS. The host then resolves the specified URL to the dynamic IP assigned to the client and the user is connected directly to the NVS.

In order to be able to upgrade all aspects of software/firmware at a NVS site, the system supports a remote user login (similar to telnet) interface. Once logged in a user with the appropriate privileges can upload files, databases and applications on the NVS host. The user can also transfer these files into devices such as routers, switches, video servers, etc. . . . that support remote firmware upgrades.

Adaptive Compression/Bandwidth Management

A whole variety of video compression algorithms exist in the market today. Each compression algorithm has advantages and disadvantages for specific applications and environments. When a digital video system is developed it is delivered with a specific algorithm such as MJPEG embedded into the application. By implementing the compression algorithm as a separate software layer in the system, the system can be directed to select which algorithm to use on a camera by camera or system wide basis. The issues when selecting a specific compression algorithm are whether or not amount of data is an issue, what level of quality is required, and who the end client might be. For court room evidentiary requirements MJPEG may be required however if video is just used for remote viewing a more efficient algorithm like MPEG4 might be acceptable.

Various video compression algorithms operate at different levels of efficiency based on the environment in which the camera is placed. If optimal efficiency is required the system supports a test mode wherein the system will sample the installed compression algorithms against a specific camera for a set time. The NVS will then automatically evaluate which compression algorithm provided the most efficient video collection. Upon completion the system can dynamically set the video compression for the camera to the best suited algorithm or just provide a test report to the administrator for manual selection.

An average compressed 320×240 (CIF) video image can requires 15 k bytes of data. At 60 fps this translates to roughly 1 Mbytes/sec, or 10 M Bits/second. Assuming a 50% overhead in packet transmission and retries this amount of data can account for a 15% slice of a 100baseT (100 Mbit) network. With continuous recording this amount of data will slow responsiveness on a busy 10BaseT corporate network. If the NVS is on a corporate network it can be directed via administrative entries to run at lower rates during high network activity times (such as 9:00 AM-5:00 PM) and at maximum rates during lesser used times.

The same algorithm described above can go into a schedule override mode if a specific event is detected (such as a door open detected) and run at max capture rates, until a terminating event is detected.

Figure 2:
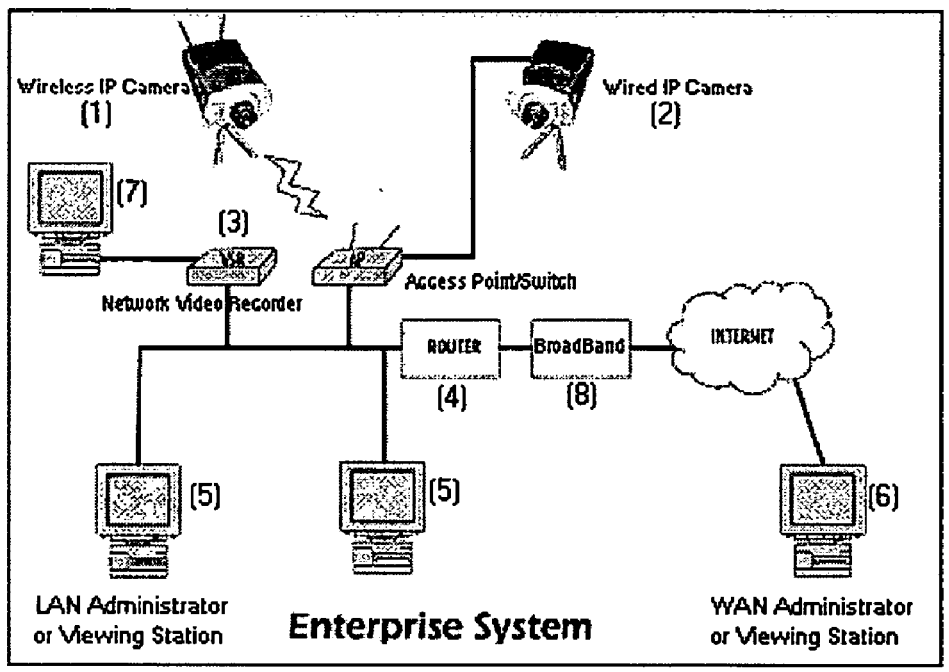
FIG. 2 is a block diagram containing the components from FIG. 1 and showing an optional local monitor (item 7) connected directly to the NVR (item 3)
Figure 17:
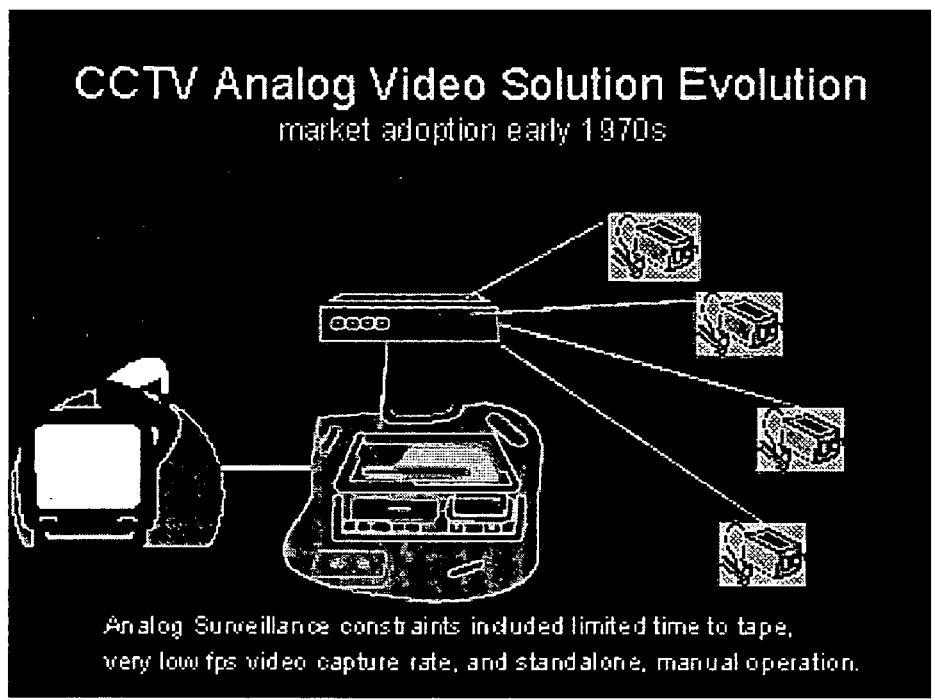
FIG. 17 is a block diagram of a typical CCTV video system
Figure 18:
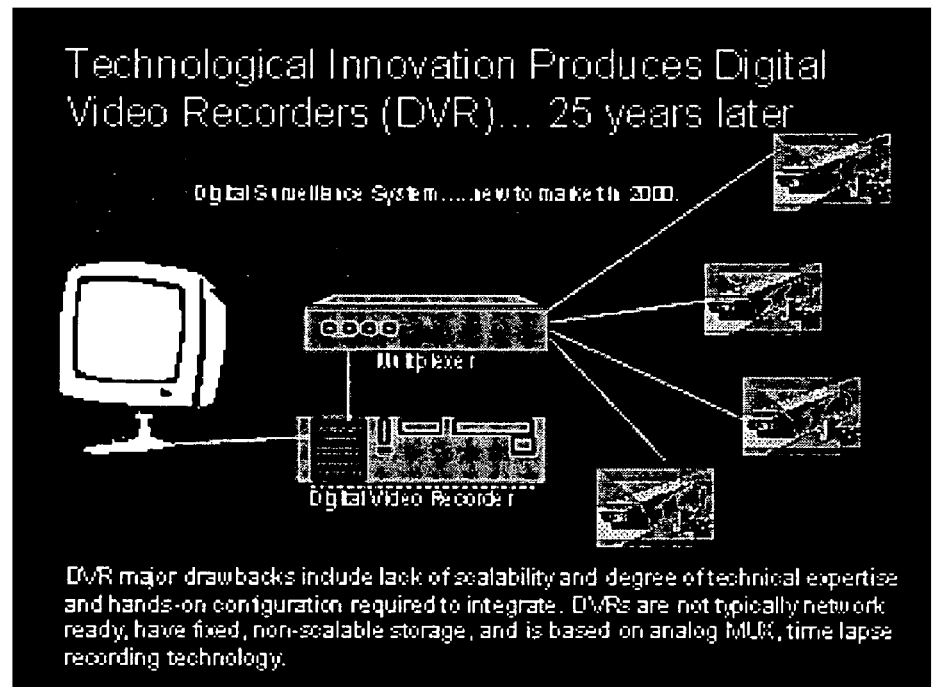
FIG. 18 is a block diagram of a CCTV system wired to a Digital Video Recorder (DVR)
Figure 19:
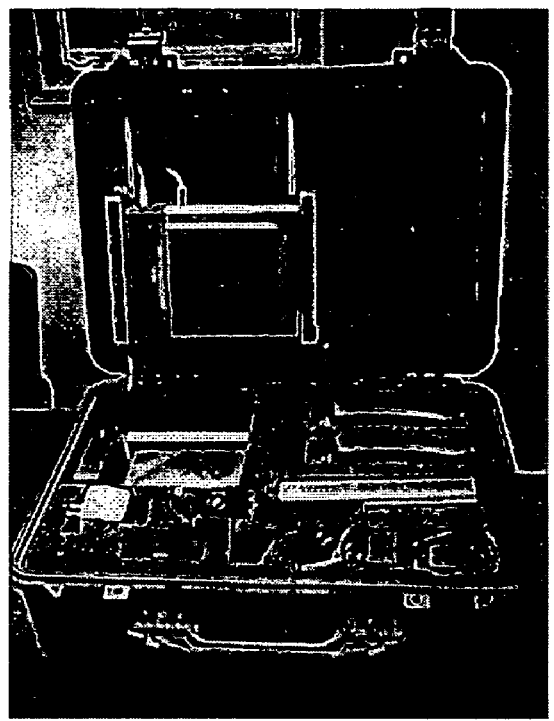
FIGS. 19, 20 shows the Wireless network video system in a suitcase.
Figure 20:
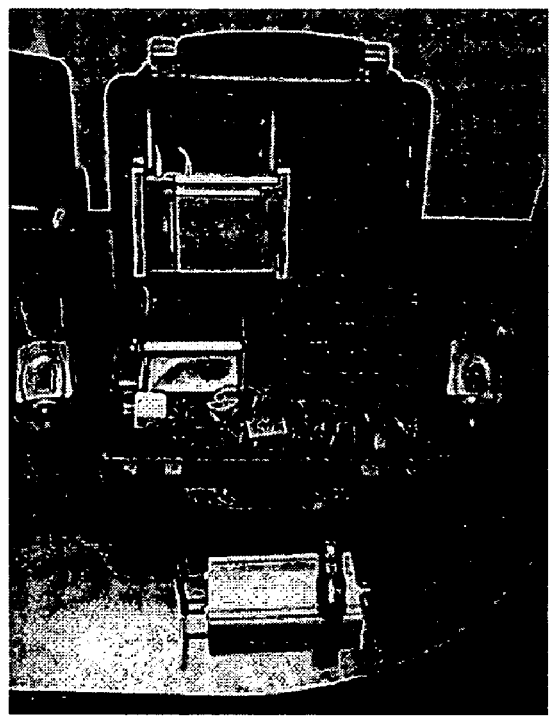

Monitoring Peripherals:

As with traditional video system and per FIG. 2, the system can contain an optional monitor that is physically attached to the Network Video Server (NVS). This local monitor is solely replicating traditional video systems and used for viewing purposes only. Similarly, the system supports a status logging line printer at the server or at a remote site that constantly logs events as they occur. These events are determined by the system administrator.

A user, whether connecting locally on the router's private subnet, or from an outside network via the internet is capable of viewing video on his system based on assigned device access rights that are set up by a system administrator. Depending on access privileges, a user may also have authority to playback pre-recorded video, and administer the system.

System Configuration:

In medium to large companies there is typically a network administrator whose job is to manage the computer network infrastructure. Because the NVS combines the complexities of a networked computer system with a video management system many of the network complications must also be managed and controlled. This level of expertise is not common among video providers/integrators and thus creates an entry barrier for NVR solutions into the market place. To remove this obstacle, the entire networked system for the NVS, including all IP cameras, IP video servers, switches, routers, dynamic IP hosts and the NVR is pre-configured automatically during the system boot process. This provides a "Network Encapsulated" video solution with all relevant network information managed by a pre-configured enterprise class database server running on the host computer. Some of the encapsulated attributes include: IP and gateway addressing, subnet masks, virtual address ports, Encryption Keys, dynamic IP management.

Database Infrastructure:

To develop a sophisticated and highly complex network video system supporting abstract data models requires account management, device management, resource management, time/event scheduling and data management. To efficiently manage multiple data models and also enable high performance operations with a minimum level of algorithmic complexity, an enterprise class data base with a database server running SQL is embedded into the NVS. The SQL server is directly queried by embedded applications running internally on the NVR to manage recording, and directly from remote and local client users and applications as they connect to the NVS. The data base server, via SQL commands, initially authenticates connecting users (authentication screen FIG. 3) against the database, which may reside on the local server or on any remote machine such that the system can connect to the remote. After proper authentication, it delivers a user profile to the graphical user interface builder (GUIB). The GUIB dynamically builds unique HTML interfaces to each connecting user. The interface that is dynamically created uses time schedules from the database to determine time based resource and functionality allocation to end users. Two menus that may be created for a specific user are shown in FIGS. 4-5.

Each user in the system is associated, via the database server, with a specific group of users. Groups are used to simplify management of systems with multiple users. Changing a single attribute in a group will reflect all users associated with that group. An example attribute of a group is the cameras that users in the group will have access rights to view. Another example is whether users in the group have access to video playback of pre-recorded video clips. The NVS enables group creation, editing, deletion and group association to resources such as cameras. All group management is accomplished from the user interface that is created dynamically when an administrator logs into the system from an IE browser. Sample user interfaces for group associations are shown in FIGS. 6-7. The NVS supports dynamic creation of groups, with each group having its own definable privileges. Designing the system in this manner enables an unlimited number of privilege levels.

The NVS provides the ability to unilaterally override access privileges assigned to groups. This term is knows as camera Cloaking™. Cloaking will enable a resource that may normally be available to be indefinitely locked out. Until a device, camera or site is "Uncloaked", no accounts will have their granted access rights to that resource (when the check box labeled "cloaked", shown in FIG. 8, is checked the associated camera will not be available to any users).

Multi-Site Enumeration

The system supports functionality to dynamically build remote viewing consoles with cameras from multiple, physically separate sites on unique networks, into a single viewing window. This occurs automatically once the user is authenticated by the system. The authenticating NVS has a built-in table with entries containing the URLs of remote sites that privileged users will have immediate access to once they are authenticated.

Personal Preferences:

Each user will also be provided with personal preferences for the video system. Such preferences, stored by the host, determine viewing modes, and viewing algorithms specific to an individual user. Private viewing algorithms include both: Java and ActiveX. Java is provided for remote clients that may not have the ability to upload an ActiveX video player (for instance at an airport KIOSK). This accomplishes the use anywhere feature of the system. The personal setting menu, which is available to all users, is displayed in FIG. 9.

Adaptive Network Bandwidth Management:

When the system is integrated into an existing corporate LAN the network may not have the necessary bandwidth to allow digital video to be archived during normal business operations. If remote or offsite archival is desired the system can incorporate a time schedule when network bandwidth is available and at that time automatically performs offsite video archival. The system settings menu contains the schedule for offsite/remote archival and backup. The system further has controls for throttling other attributes that affect total network bandwidth. Controls within the application can be enabled to increase or decrease compression for video streams in order to reduce the total amount of video that passes onto the network for recording and viewing. The system also is designed to support a variety of different compression algorithms such as MPEG, MJPEG, and H.263. By implementing a smart compression engine the system can further reduce network bandwidth or increase frame rates by selecting the appropriate compression engine based on camera placement, time of day and adaptive video analysis operations.

Remote Upgradeability:

The NVS is configured to run an application that allows a remote user to connect directly into all integral components of the system. Once logged in the user can update applications on the server, and directly manage the server's internal database or change the database schema. Additionally once connected firmware can be updated in the network routers, switches and access points. Cameras and video servers that have the capability to allow firmware upgrades can also be upgraded when a user physically logs into the NVS.

Failure and Recovery Mechanisms:

One major weakness when migrating from totally analog CCTV solutions to digital solutions is that each device has multiple points of failure including internal device hardware errors or algorithmic errors. To deal with these issues the system has built in time based maintenance procedures to prevent problems before they arise. These operations include scheduled hard drive defragmentation based on entries from the database; periodic timed device reboots to clean up memory leaks by the OS, real-time user and daemon operation analysis applications. Several software watchdogs have been implemented to detect application lockup on the recorder. If a camera hangs the system will turn it off-line temporarily and then retry it periodically to bring it "back to life". If the recorder application hangs the system will restart the application several times after which it will reboot the OS. If it detects problems after an OS reboot the system has an inline hardware watchdog that can cycle power and cause a hard reboot of the server.

When the system detects a communication loss to a network infrastructure device such as a router, switch or access point it will cycle power at that device. To enable this feature, remote network infrastructure components can be supplied power via Power over Ethernet (POE) adapters. POE base units will be plugged into a universal power backbone of which line power can be interrupted by the centralized hardware watchdog (thus rebooting the remote device). One such POE device is the DWL P-100 shown in FIG. 14.

Cameras and video servers, that are not "Watchdogged" via a POE adapter, shall have a hardware I/O monitoring device with an expected duty cycle attached to the output from an I/O terminal of the camera/video server. The output terminal at the device will be driven by the remote NVS. If the expected duty cycle for the output is not detected by the hardware watchdog, an inline relay temporarily cycles power to the device thereby causing a hard reboot on the device. This mechanism works whether the video server is running on a hard-wired or wireless connection to the NVS.

One major weakness of marketed video products today is that they continue to use non-volatile storage as if it was magnetic tape. This presents a problem in overall system performance. A continuously accessed hard drive will create file fragments and become less efficient with every update. Most operating systems support a hard drive defragmentation algorithm to restore drive performance. In order to get the best use out of the hard drive, the NVS runs scheduled hard drive defragmentation, in parallel with system operation. Similarly it can be programmed to shut down at a very infrequent time schedule in order to clear up any memory leaks or resource outages that may have occurred.

Storage:

Digital video recorders, record video onto a hard drive physically attached to the device. With the NVS, the database specifies either a local drive pointer or a URL based pointer which resolves the address of an IP based network storage device or system.

Overlapped Recording™:

One aspect of video files that has traditionally plagued systems with consecutive video frames is that the time between any two video files may have frames that were lost when one record operation ended and a second began. The NVS can be set up to have a single camera start the next recording session before terminating the earlier session. This effectively replicates the video frames at the end of one video file and the beginning of the successor file (overlapped video). The user can set the overlapping time window in the data base to either 0 or some limited time window.

Video Cache™:

The system can support recording of video to multiple hard-drives simultaneously. The smaller drive generally acts as a video cache from which the larger drive's video files are generated. Files are deleted from both drives in a FIFO manner.

To allow for a permanent "hardcopy" of video files, the system supports an archival mechanism to DVD in which a minimum of a full days worth of video from multiple cameras can be recorded. The system requires that DVDs are replaced on a scheduled basis before they run out of space.

Accessing Recorded Video:

The mechanism for accessing video is provided by menus that are dynamically created based on existing cameras, dates and times of recorded video. This real-time archival directory provides an interface for a user to drill-down to a specific time of day for a specific camera. The top level menu as shown in FIG. 11 contains the name of each camera on the site to which the user has logged in. The name is the name that an administrator assigned to the camera. After selecting a specific camera a menu is built showing dates to which digital video data is available (FIG. 12). Finally the user is presented with a set of entries containing a digital video file for a specific time (FIG. 13). These files can then be selected and copied to the user's local machine, and played directly. In addition to each individual file containing a time stamp and camera name assigned by an administrator video files also contain one to several event attributes that indicate any event activity that occurred during the clip time frame.

Such attributes can include motion at a motion detector, software video motion detection, an i/o input triggering or any other such monitored event. These tags can be used as filters to sort through video files when looking for video with specific attributes only.

Switched Speedcharger™:

For many outdoor applications, such as parking lots and local roads, lamp posts are ideal mounting points for wireless cameras. Many such outside posts have power that may only be available during the on-time of the light fixture. To enable a camera to operate on such a fixture 24/7 it must have continuous power. This is provided by placing a recharging battery circuit inline with the post's power that charges during the posts on-time. Such a device must charge fully for the post's off-time so that camera can derive power from the battery circuit during post off-time and directly from the post's power supply during its cycle on-time.

NVS Time Sharing

In many instances a single NVS has sufficient horsepower to cover multiple co-located independent clients. In such a case multiple clients can share the overhead of maintaining a single NVS'. In this model an access point functions like a network hot spot providing each client with their cameras connectivity to the NVS. Each client is set up with a private user account that will access only their cameras via the NVS.

This NVS hotspot works well in mall and office type environments where a single NVS has the capacity to serve several businesses.

Covert Spread Spectrum Device

A covert device using digital spread spectrum radio technology to deliver data to/from spread spectrum transceivers. This device would be housed in a variety of concealable packages, including but not limited to clocks, smoke detectors, exit signs etc. The uniqueness is the application of spread spectrum technology in these types of covert devices. This concept could apply to devices such as cameras, access control and microphones. FIGS. 22 and 23 show an implementation of a covert digital wireless camera inside an exit sign enclosure. FIG. 22 item 1 shows the 802.11 based transceiver board, item 2 shows the attached digital camera imager with a "bullet-hole" lens, and item 3 shows the antennas (see provisional patent 60/487,486, Jul. 16, 2003).

Total Wireless Implementation

Figure 21:
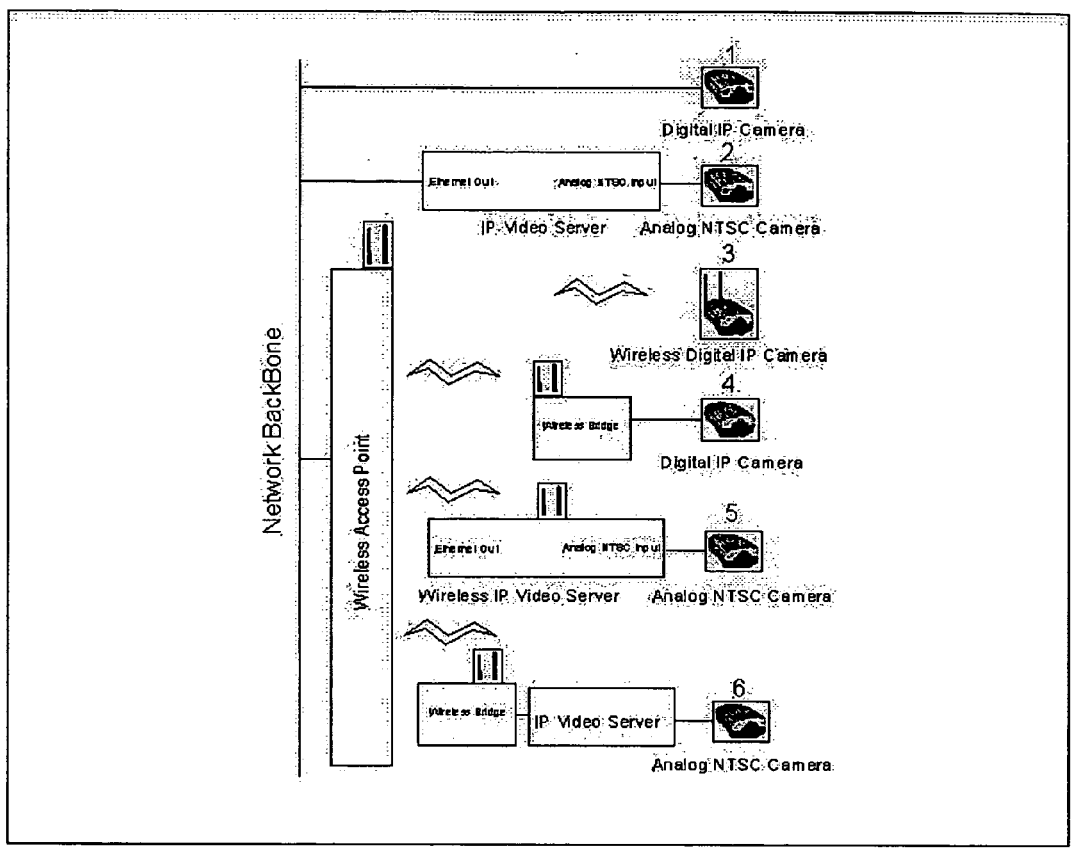
FIG. 21 shows several variations for connecting cameras to the NVS (including both wired and wireless connections for IP cameras and NTSC cameras)

The NVS has incorporated a comprehensive wireless implementation. Many low end analog wireless systems were designed but have not provided satisfactory performance and quality in an industry where reliability is a requirement. To enable a robust solution such that a wireless implementation can provide similar results to wired solutions, a spread spectrum digital solution using 802.11 components has been implemented. This system supports 802.11 routers (such as DLINK 614+), Access points (DLINK 900 AP), 802.11 Ethernet Bridges, and integrated 802.11 IP cameras (FIG. 21 connection 3).

The implementation works both indoor and outdoors with outdoor weatherproof enclosures for all infrastructure components. To meet the needs in a varying range of applications a whole variety of wireless antennas and signal repeaters (DLINK DWL-900) are supported. The system supports a variety of integrated wireless cameras (such as DLINK-1000w, Vivotek 3133).

The system directly supports wireless IP cameras. IP cameras that are not wireless can be adapted into a wireless configuration using a wireless Ethernet bridge (FIG. 21, item 4). Off-the-shelf wired analog cameras are also supported by this design. To accomplish this, off-the-shelf cameras are connected to digital video servers by connecting the wired output from the analog camera to the input of the video server. The digital video server's video encoder then converts the analog video stream to a digital stream. If the video server has built in 802.11 (Cellvision CAS-201w) then the video stream is directly transmitted to a local access point or repeater (FIG. 21, item 5). If the video server does not have built in 802.11 (Axis 2401), then the output from the video server is connected to an Ethernet to 802.11 bridge which then transmits the video stream to the local access point or repeater (FIG. 21, item 6)

Finally, to meet the needs of hazardous and or corrosive environments an air tight enclosure design has been implemented for 802.11 wireless cameras. The design enables proper heat dissipation while totally sealing internal components from the elements in corrosive or chemically hostile environment. (FIG. 16. shows a wireless camera and power supply in the necessary enclosure to prevent chlorine contamination of the system at an indoor pool)

Wireless Elevator Camera

The major complication of installing cameras in elevators is the mechanical elevator wiring harness mechanism. To do an install of this sort the elevator must be placed out of service and the shaft must be entered and wires strung through the harness. By installing a wireless spread spectrum camera in the elevator and a wireless access point remotely or at an opposing end of the elevator shaft, no harness wiring is required. This elevator camera system reduces the time and cost of an elevator install to a fraction of traditional implementations.

Wireless I/Os

The system includes a device to receive and transmit encoded commands to control and monitor external wireless devices from a wired source. The wired source connects directly to device. The commands are received and transmitted using wireless media including but not limited to RF or Infra-Red.

When a received command matches a predefined code, a specific output toggles or is set to a specific state. The device has multiple outputs allowing multiple commands to be received and the associated output changes state based on the command.

The transmitted commands are sent based on the state of an input. The device has multiple inputs allowing commands to be sent based on the associated input that changed state.

The device has a universal power input allowing it to be powered by a wide range of power sources. The power source connectors are pass-through, allowing the power to be daisy-chained through the device to the wired source. The device uses microcontroller allowing many different protocols to be used. (See provisional patent 60/487,271, Jul. 16, 2003)

Unwired Digital Logic:

The system database includes the ability to create logical relationships from I/O peripherals and other events which can be strung together to create logical action statements. If such a logical statement becomes true at any point the NVS embedded time/event manager asserts an output relationship statement. An output statement can be used to:

Initiate recording

Initiate an alarm

Send out status information

Drive a logical input to a secondary output statement

An example of such a use could be an input from a Passive infrared Detector (PIR) at any camera. This could be logically or'd with all PIRs in the system. An event at any PIR could then set of an alarm which would be driven to one or one of many alarms that may be on the network of the system (locally or remotely).

Similarly an event could be triggered only if the devices triggered in a specific assigned order, within a specific time frame, or if all events detected activity simultaneously. The database front end provides a user interface for building the logical event sequence and triggering tables. A specific example of a timed sequential use would be to determine if guards are periodically performing a guard duty. This would require a periodic detection of motion sensors (software or hardware) to match a predefined sequence. If within a certain time period a set of triggers were not activated a message could go out alerting of a potential security hole in the system.

Network Video Suitcase™

As per photos 19 and 20 the Suitcase NVS is a self-contained NVS solution in a suitcase. All that is required to set up this networked video solution is AC power, and mounting of cameras. From that point on the system creates a video hotspot with the Server recording data 24/7 onto an internal hard drive in the suitcase. The suitcase shown contains all wireless cameras; however these devices can run with or without cables. Suitcases can be designed to contain a variable number of cameras. This system includes a hardware firewall, which can be connected directly into a WAN or LAN, 40+ days of video camera storage, and an output port for a direct connection to a local viewing monitor.

Wireless Cash Register Peripheral:

Some video systems incorporate transaction informational from cash registers superimposed on top of the video from cameras at the register. This is done so that transactional activity can be correlated to activity that occurred at the time of the transaction. Transactional information is transmitted via a serial port at the cash register to the DVR where the video/transaction information is combined. This physical connection mechanism limits the connections to a DVR by the number of physical ports on the DVR. By implementing a wireless serial network bridge, the register's transaction port simply becomes a virtual network device without any limit to the number of such devices that can exist in a system. Similarly as with the conventional model, the NVS overlays the cash register data directly on the video images.

Remote Monitor Detection Algorithm:

Now that video is available to be viewed remotely, companies are beginning to offer services for off-site monitoring. A mechanism is needed to detect whether offsite physical monitoring is effectively occurring. The description below implements this mechanism.

A sequence of well defined pseudo-random objects is inserted into video streams being viewed remotely. The person monitoring the cameras remotely is responsible for acknowledging these objects by providing feedback to the system. If the system detects a specific period of invalid or no feedback within a tolerance limit, it can determine the action that must be taken to properly analyze the occurrence of events that occurred during the monitoring time window. An example of such a mechanism is a random cycling of keyboard keys in various camera window views. As the keys pop up the remote user can hit them on the remote keyboard thus acknowledging that he is viewing the activity at the camera.

Additionally remote guards may be randomly provided with cameras that need to be monitored. Without any prior experience with the site the guard must be able to interpret activity at a remote site and on certain events must be able to respond appropriately. To enable this capability, each camera will be provided with a monitoring profile describing the camera and what activity demands a response, and what action to take on certain events. This profile can be integrated into the camera database; it is entered by administrators at a centralized command center, and is viewable by the remote monitors.

POE Terminal Adapter:

A Power over Ethernet (POE) adapter transmits power from a power source at a POE base unit (near side) to a POE terminal unit (far side). The POE terminal unit converts the transmitted voltage to a specified voltage (i.e. 5 VDC) and provides a power adapter for the remote device. Many times there can be multiple devices at the far side with varying power requirements. An example is an analog camera which requires 12 VDC, a digital video server requiring 5 VDC, and an outside enclosure cooling fan at 24V. To accommodate a multi-voltage situation, a POE power converter which takes a single POE terminal voltage and transforms it into one or more output voltages, each one of which can be stepped up or down to meet device power requirements at the remote device, is implemented.

"Set Up and Run" Solution:

A main goal of the NVS solution is to provide a mechanism wherein the on-site installation and setup complexity of a networked video system replicates that of a traditional analog CCTV installation. To accomplish this, a "total package" solution has been implemented, wherein the system is delivered with all components including server, switches/routers, and IP cameras. Further the system is preconfigured to "Power UP and Run". The end user or installer is only required to mount the cameras, connect their power adapters, connect the network cables between devices and network switch (in the same manner required to connect analog cameras to the multiplexer) and turn the system on. From that point forward the system should be up and running; accessible from the intranet or internet.

To accomplish a "Set Up and Go" strategy, a methodology of performing the entire network configuration prior to on-site installation has been developed. Prior to shipment the entire system is configured and tested. The testing includes both local and internet operation testing. When testing is complete the system is re-packaged, shipped to the end user and ready for installation. So long as the client provides the appropriate connections to the internet via an ISP, the system will install and run without any configuration. Further, if a wireless solution is chosen the camera physical connection step is eliminated. By virtue of the dynamic IP client aspect of the system, even the client's URL is pre-verified and will not require any client-side setup. (An interesting aspect of this type of network solution is that it can be moved from site to site without ever requiring configuration so long as no hardware changes are made)

Lease Subscription Model

This mechanism enables a system administrator to sign up users for viewing access for a specific time period (lease). On expiration of the period the system automatically locks out the user's access. If a lease expires and a user logs in they can be redirected to a re-subscription page informing them that their lease has expired and letting them know how they can extend their lease (if the option is available). This mechanism is designed for pay per view operations such as childcare (an automatic payment option may also be available on line if the lease terminated for non-payment reasons).

What is claimed is:

1. A stand-alone, WAN/LAN IP based video-monitoring/recording/playback system comprising:
a centralized server machine having an internal web server engine, a user account management system, and a built-in network video recorder (NVR);
a non-volatile storage device for archival of digital video frames;
a network switch/access point and/or router for interconnecting the components including at least the server and IP devices including at least IP cameras or IP video servers;
an architecture such that viewing and management consoles, external hard drives, and cameras reside locally on the internal subnet of the system, or on any remote network connected to the system using the WAN or internet;
a set of HTML pages that are exported to a connecting browser for viewing, playback, and system management whereby all remote access is effected using standard browsers without remote client software, further comprising means for overlapping recording files so that any two time sequential files contain the same replicated video at the end of the first file that exists at the beginning of the second file.

2. A stand-alone, WAN/LAN IP based video-monitoring/recording/playback system comprising:
a centralized server machine having an internal web server engine, a user account management system, and a built-in network video recorder (NVR);
a non-volatile storage device for archival of digital video frames;

a network switch/access point and/or router for interconnecting the components including at least the server and IP devices including at least IP cameras or IP video servers;

an architecture such that viewing and management consoles, external hard drives, and cameras reside locally on the internal subnet of the system, or on any remote network connected to the system using the WAN or internet;

a set of HTML pages that are exported to a connecting browser for viewing, playback, and system management whereby all remote access is effected using standard browsers without remote client software;

wherein the system is fully incorporated into a suitcase supporting three to nine IP cameras, that can be instantaneously deployed.

3. A stand-alone, WAN/LAN IP based video-monitoring/recording/playback system comprising:

a centralized server machine having an internal web server engine, a user account management system, and a built-in network video recorder (NVR);

a non-volatile storage device for archival of digital video frames;

a network switch/access point and/or router for interconnecting the components including at least the server and IP devices including at least IP cameras or IP video servers;

an architecture such that viewing and management consoles, external hard drives, and cameras reside locally on the internal subnet of the system, or on any remote network connected to the system using the WAN or internet;

a set of HTML pages that are exported to a connecting browser for viewing, playback, and system management whereby all remote access is effected using standard browsers without remote client software; and an array of independent hardware i/o devices whose inputs and outputs can be received and driven from the server to function as if in a "wired OR", "wired EXCLUSIVE OR", "wired AND", or any other logical assignment as configured in the centralized server.

4. The system according to claim 3 further comprising hardware I/Os that can be driven to cause an event triggering mechanism based on logical relationships between the I/Os, time/date, and sequence of occurrence of events.

5. The system according to claim 4 further comprising a mechanism to implement a guard duty detection circuit, and via software and hardware monitor and report guard duty activity.

6. A stand-alone, WAN/LAN IP based video-monitoring/recording/playback system comprising:

a centralized server machine having an internal web server engine, a user account management system, and a built-in network video recorder (NVR);

a non-volatile storage device for archival of digital video frames;

a network switch/access point and/or router for interconnecting the components including at least the server and IP devices including at least IP cameras or IP video servers;

an architecture such that viewing and management consoles, external hard drives, and cameras reside locally on the internal subnet of the system, or on any remote network connected to the system using the WAN or internet;

a set of HTML pages that are exported to a connecting browser for viewing, playback, and system management whereby all remote access is effected using standard browsers without remote client software;

an enterprise class, distributed, relational database server that is integrated as part of the overall system enabling complex functionality, scalability, and maintainability; and an array of independent i/o devices whose inputs and outputs can be received and driven from the server to function as if in a "wired OR", "wired EXCLUSIVE OR", "wired AND", or any other logical assignment from a single point setup and managed by the database.

7. The system according to claim 6 further comprising hardware I/Os that can be driven to cause an event triggering mechanism based on logical relationships between the I/Os, time/date, and sequence of occurrence of events all of which are setup via the database.

8. The system according to claim 7 further comprising a mechanism to implement a guard duty detection circuit, and via software and hardware monitor and report guard duty activity.

9. A stand-alone, WAN/LAN IP based video-monitoring/recording/playback system comprising:

a centralized server machine having an internal web server engine, a user account management system, and a built-in network video recorder (NVR);

a non-volatile storage device for archival of digital video frames;

a network switch/access point and/or router for interconnecting the components including at least the server and IP devices including at least IP cameras or IP video servers;

an architecture such that viewing and management consoles, external hard drives, and cameras reside locally on the internal subnet of the system, or on any remote network connected to the system using the WAN or internet;

a set of HTML pages that are exported to a connecting browser for viewing, playback, and system management whereby all remote access is effected using standard browsers without remote client software;

a wireless access point for connecting wireless video servers and wireless IP cameras;

wherein the system is fully incorporated into a suitcase supporting three to nine IP cameras, that can be instantaneously deployed.

* * * * *